United States Patent
Zimmer et al.

(10) Patent No.: US 10,299,446 B2
(45) Date of Patent: May 28, 2019

(54) SEALED CONNECTION FOR FLUID CONDUIT PARTS

(71) Applicants: Ronald A. Zimmer, Dewitt, IA (US); Rick Braasch, Davenport, IA (US); Mitch Gravert, Miles, IA (US); Michael Grinnall, Clinton, IA (US); Craig J. Bormann, Dewitt, IA (US)

(72) Inventors: Ronald A. Zimmer, Dewitt, IA (US); Rick Braasch, Davenport, IA (US); Mitch Gravert, Miles, IA (US); Michael Grinnall, Clinton, IA (US); Craig J. Bormann, Dewitt, IA (US)

(73) Assignee: Custom-Pak, Inc., Clinton, IA (US)

( * ) Notice: Subject to any disclaimer, the term of this patent is extended or adjusted under 35 U.S.C. 154(b) by 819 days.

(21) Appl. No.: 14/634,394

(22) Filed: Feb. 27, 2015

(65) Prior Publication Data

US 2016/0249540 A1    Sep. 1, 2016

(51) Int. Cl.

| | |
|---|---|
| *A01G 25/14* | (2006.01) |
| *B29C 49/42* | (2006.01) |
| *B29C 49/50* | (2006.01) |
| *B29K 101/00* | (2006.01) |
| *B29L 31/00* | (2006.01) |

(52) U.S. Cl.
CPC .......... *A01G 25/14* (2013.01); *B29C 49/4278* (2013.01); *B29C 49/50* (2013.01); *B29K 2101/00* (2013.01); *B29L 2031/712* (2013.01)

(58) Field of Classification Search
CPC ....... A01G 25/14; F16L 37/252; F16L 37/242
USPC ........................................ 285/921, 402, 110
See application file for complete search history.

(56) References Cited

U.S. PATENT DOCUMENTS

| | | | | |
|---|---|---|---|---|
| 2,507,535 | A | * | 5/1950 | Madsen .................. F16L 37/48 285/921 |
| 2,943,349 | A | | 7/1960 | Adams et al. |
| 2,965,310 | A | * | 12/1960 | Gettelman ............. A01G 25/14 239/391 |
| 3,031,718 | A | | 5/1962 | Adams |
| 3,456,290 | A | | 7/1969 | Ruekberg |
| 3,752,627 | A | | 8/1973 | Bourgeois et al. |
| 3,809,412 | A | * | 5/1974 | Glover .................. F16L 21/025 285/110 |
| 3,951,436 | A | * | 4/1976 | Hyde, Jr. ................ F16L 25/08 285/110 |
| 4,017,103 | A | * | 4/1977 | Lorkowski ............ F16L 41/023 285/402 |

(Continued)

*Primary Examiner* — David Bochna
(74) *Attorney, Agent, or Firm* — St. Onge Steward Johnston & Reens LLC

(57) ABSTRACT

An assembly of fluid conduit parts is disclosed along with a method of assembling, a method of manufacturing and an apparatus for manufacturing the one of the fluid conduit parts. The assembly includes a blow molded part having a first portion. A second part includes a tapered section and a sealing flange extends from the first portion towards a central axis of the first portion at a distance, an end of the sealing flange defines an opening. The second part inserts into the opening and at least part of the tapered section is of a size larger than the opening. The sealing flange flexes upon insertion of the second part into the opening to define a contact surface between the tapered section and the sealing flange that extends around a perimeter of the tapered section where the sealing flange contacts the tapered section.

22 Claims, 17 Drawing Sheets

(56) References Cited

U.S. PATENT DOCUMENTS

| | | | | |
|---|---|---|---|---|
| 4,067,534 A | * | 1/1978 | Frey | F16L 37/098 |
| | | | | 285/921 |
| 4,099,744 A | * | 7/1978 | Kutnyak | F16L 33/227 |
| | | | | 285/921 |
| 4,178,146 A | | 12/1979 | Kinsley | |
| 4,538,836 A | * | 9/1985 | Krutten | A61M 39/10 |
| | | | | 285/921 |
| 4,653,676 A | * | 3/1987 | Stull | B65D 47/06 |
| | | | | 285/921 |
| 4,758,023 A | * | 7/1988 | Vermillion | F16L 37/252 |
| | | | | 285/921 |
| 4,878,900 A | * | 11/1989 | Sundt | A61M 1/0039 |
| | | | | 285/921 |
| 4,993,756 A | * | 2/1991 | Bechu | F16L 37/0985 |
| | | | | 285/921 |
| 5,015,374 A | * | 5/1991 | Mathieu | B01D 61/30 |
| | | | | 285/921 |
| 5,163,718 A | * | 11/1992 | Cannon | F16L 17/025 |
| | | | | 285/110 |
| 5,529,743 A | | 6/1996 | Powell | |
| 5,698,236 A | | 12/1997 | Hobson | |
| 5,910,283 A | | 6/1999 | Hobson | |
| 6,302,336 B1 | * | 10/2001 | Brown | A01G 25/14 |
| | | | | 239/394 |
| 6,719,554 B2 | | 4/2004 | Hobson | |
| 8,708,376 B2 | * | 4/2014 | Tracey | F16L 37/02 |
| | | | | 285/921 |
| 2003/0090024 A1 | | 5/2003 | Skov et al. | |
| 2005/0274742 A1 | * | 12/2005 | Monsalve | A01G 25/14 |
| | | | | 222/157 |
| 2013/0175739 A1 | | 7/2013 | Zimmer et al. | |

* cited by examiner

SEALED CONNECTION FOR FLUID CONDUIT PARTS

FIELD OF THE INVENTION

The following invention relates generally to blow molded parts and the corresponding molds and methods for manufacturing the same. More particularly the invention relates to a mold, method and blow molded part that provides improved sealing at a junction with another part.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

Before the blow molded part is removed from the mold, it is typically separated from excess parison material called flash. This step can be completed in-mold or can involve secondary operations. Typically, once the parison is extruded between the mold halves, it is pinched off at the top and/or bottom and then blown into a part that takes the shape of the mold cavity. The pinch-off generates excess plastic material in the form of top and/or bottom flash.

Flash generation imposes limits on blow molding efficiency. In some cases, Flash removal is done with an in mold blade as shown and described in U.S. Pat. Pub. No. 20130175739, the content of which is incorporated by reference herein.

Although the above referenced publication discusses various parts, systems, methods and/or features that can be used to the task of flash removal in mold, in cases where the part is joined to another part, an improved seal is desired and therefore such improved parts, machinery and methods of manufacture are desired.

SUMMARY OF THE INVENTION

It is an object of the present invention to provide improved in-mold cutting or punching techniques that control wall thickness and/or cut residue in order to provide improved sealing between two parts.

It is further an object of the present invention to provide a mold and method for manufacture of parts with improved sealing features.

It is a further object of the present invention to provide parts that securely and/or removably attach to another part to provide a reliable and lasting seal.

These and other objects are achieved by providing a twist lock blow molded part and a second part having corresponding locking features where the interface between the twist lock blow molded part and the second part includes an integrally formed cut residue that pushes against the second part when the twist lock and second parts are joined and locked in place to provide improved sealing of the interface.

In one aspect an assembly of fluid conduit parts having a sealed connection between the fluid conduit parts is provided and includes a blow molded part having a first portion. A second part includes an outer section which may be tapered. A sealing flange extends from the first portion towards a central axis of the first portion at a distance, an end of the sealing flange defining an opening. The second part adapted to insert into the opening and at least part of the tapered section of a size larger than the opening. The sealing flange flexing upon insertion of the second part into the opening to define a contact surface between the outer section and the sealing flange such that the contact surface extends around a perimeter of the outer section where the sealing flange contacts the outer section.

The distance may be measured from an inner surface of the blow molded part and is at least as large as a wall thickness of the blow molded part. A fluid dispensing portion may be connected to the first portion, the fluid dispensing portion including at least one hole such that the fluid can escape the blow molded part through the hole. In some cases a maximum pressure is defined as a maximum fluid pressure against the sealing flange that can be sustained by the sealing flange to prevent fluid from exiting the blow molded part at the end, the fluid may generate a first pressure against the sealing flange, the first pressure having a first value and the at least one hole defining an escape area, the escape area sized such that the maximum pressure is greater than the first pressure. In some cases a lock may hold the blow molded part in place when a fluid is introduced into the blow molded part such that a pressure of the fluid presses against an inner surface of the sealing flange to thereby increase a sealing pressure between the contact area and the tapered section. The second part may be a pipe. A channel may be located between a first end of the first portion and another end of the blow molded part. A protrusion may be located on the second part and sized to fit in the channel such that the protrusion can move from a first position towards a second position, where the first position is closer to the first end than the second position. A catch may be located at an end of the channel such that when the protrusion is located at the second position, the blow molded part can be rotated relative to the second part to engage the protrusion against the catch. A notch may be defined by the catch, the notch located between two peaks formed in the blow molded part such that upon rotation of blow molded part the protrusion presses against one of the two peaks to thereby allow the protrusion to advance past the one of the two peaks such that the protrusion is located within the notch.

In another aspect a method of creating a sealed connection between two parts is provided and includes one or more of the steps of: providing a blow molded part having a first portion with an inner surface and a sealing flange extending a distance from the inner surface towards a center of the first portion; providing a second part; inserting the second part into the first portion, the first portion having an insertion point defining a radius in a range between a first radius and second radius where the first radius is defined by the inner surface at an end of the first portion and the second radius is equal to the first radius minus the distance; deforming the flange upon insertion of the first portion towards the insertion point; locking the blow molded part in place such that the blow molded part remains stationary relative to the second part when a fluid is introduced into the blow molded part.

The distance may be equal to or greater than a wall thickness of the first portion. A channel may be located between the end and another end of the blow molded part.

A protrusion may be located on the second part and sized to fit in the channel. A catch may be located at an end of the channel. The inserting step may include including moving the protrusion from a first position towards a second position, where the first position is closer to the end than the second position. The locking step may include rotating the blow molded part relative to the second part to engage the protrusion against the catch. The locking step may include engaging the protrusion against a notch defined by the catch, the notch located between two peaks formed in the blow molded part such that upon rotation of blow molded part the protrusion presses against one of said two peaks to thereby allow the protrusion to advance past the one of said two peaks such that the protrusion is located within the notch. The deforming step may include deforming the flange such that an area of contact is created between the flange and an outer surface of the second part and the area of contact is annular.

In another aspect an apparatus for creating a blow molded part for a fluid conduit assembly is provided and includes a mold having at least two mold sections which when aligned at least partially define a mold cavity. Two mold blades are each movably disposed in one of the two mold sections. A portion of the mold cavity adjacent to the two mold blades defines an end of the mold cavity and the portion of the mold cavity defines a first size aperture at the end of the mold cavity. The two mold blades define a second size aperture, the first size aperture larger than the second size aperture to define a size difference between the first and second size apertures where the size difference is greater than a desired wall thickness of the blow molded part.

The size difference may be at least two times the desired wall thickness. The two mold blades may be moved to cut the blow molded part contained in the mold cavity, the cut forms a sealing flange that extends towards a center of the first size aperture and is attached to the blow molded part. A channel may extend from a first location towards a second location wherein the first location is located closer to said two mold blades than the second location. A recess at an end of the channel may be located closer to the second location than the first location and may intersect with the end of the channel. Two peaks may be located on either side of a notch, the two peaks and notch formed in the recess such that a protrusion of a second part is retained within the notch to secure the blow molded part to the second part.

In another aspect a method of manufacturing a blow molded part for a fluid conduit assembly is provided and may include one or more of the steps of: providing at least two mold sections each having a blade therein, the at least two mold sections when aligned defining a mold cavity, the blades when aligned forming a blade aperture wherein an end of the mold cavity adjacent to the blades is larger than the blade aperture by a distance greater than a desired wall thickness of the blow molded part; expanding a parison against the mold cavity such that the parison is thins between the end and a cutting edge of the blade; and moving at least one of the blades to cut the parison at the end.

The step of expanding may force the parison against the blade such that a local wall thickness of the blow molded part at the blade prior to the moving step is 50% or less of a desired wall thickness of the blow molded part. In some cases the local wall thickness is 75% or less of the desired wall thickness. The desired wall thickness may be approximately half a distance measured from a surface of the mold cavity at the end to the blade aperture. The blade aperture may be round. At least one of the at least two mold sections may include a channel and a recess, the channel extending from a first location towards a second location wherein the first location is located closer to the blades than the second location, the recess at an end of the channel located closer to the second location than the first location and intersecting with the end of the channel. The expanding step may include expanding the parison against the channel and recess such that an inner surface of the parison defines a part channel and part recess corresponding to the channel and recess of the at least one of the at least two mold sections.

DETAILED DESCRIPTION OF THE INVENTION

Figure 1:
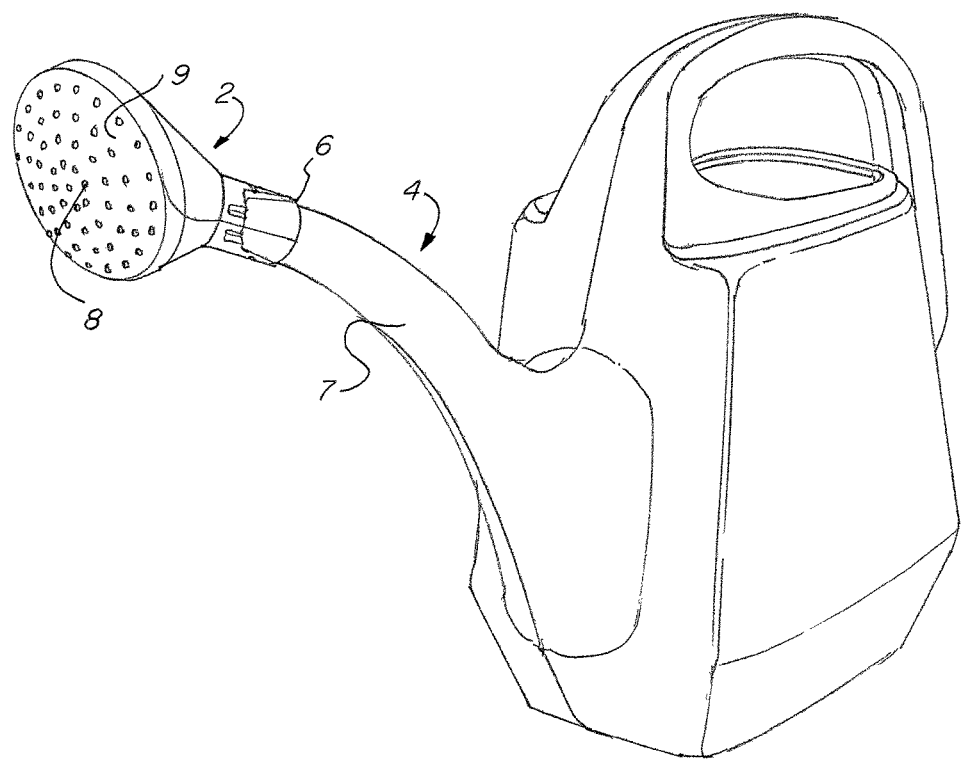
FIG. 1 is a perspective view of an exemplary assembly including a blow molded part according to the present disclosure.
Figure 2:
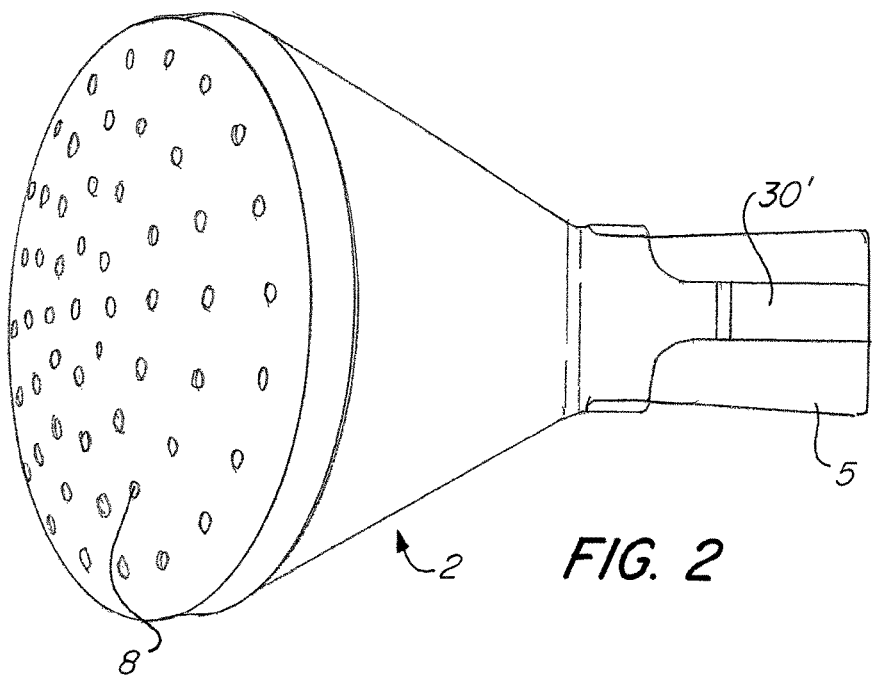
FIGS. 2 and 3 are respectively bottom and front views of a blow molded part as shown in FIG. 1.
Figure 3:
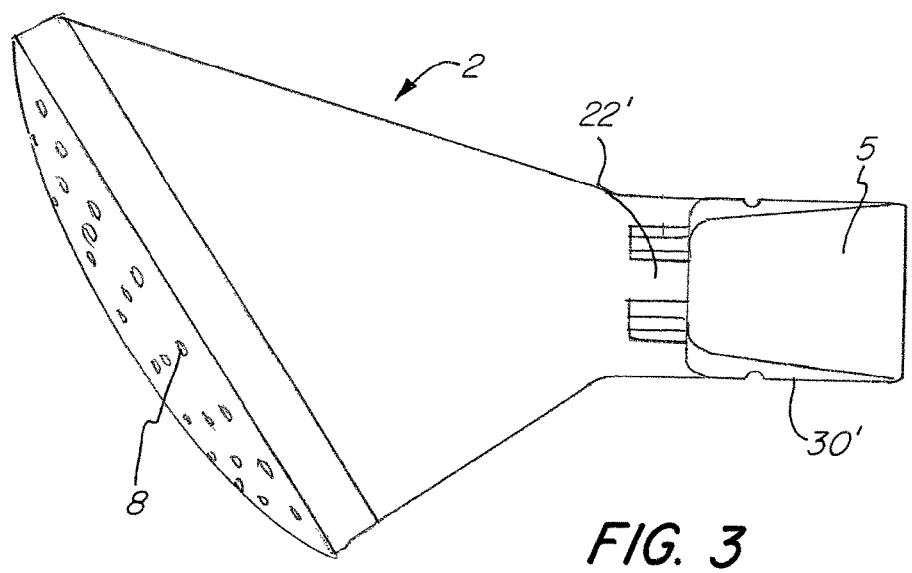

In FIG. 1 a blow molded part 2 and a second part 4 (in this case a watering can) is shown. It is understood that the second part may also be blow molded. FIGS. 2 and 3 show additional views of the blow molded part 2. The blow molded part 2 secures to the second part 4 and creates an connection 6. The blow molded part has holes 8 at one of its end for dispensing of water and the connection 6 creates a seal between the blow molded part 2 and the second part 4. It is further understood that the second party may be made by other processes, for example, the second part may be a brass, copper, iron, PEX or other type of pipe/pipe fitting. In one application, the blow molded part 2 is arranged as a shower head such that household plumbing can be used and a pipe or a fitting at the end of the pipe may include the tapered section 146 and/or the protrusions 18 as described in more detail below.

The outsides of channel 30' and notch 22' are shown in FIGS. 2 and 3. The inner sides of these structures allow for insertion and locking of the second part 4 to the blow molded part. The notch 22 may be provided on more than one circumferential location of the blow molded part 2 such that the blow molded part 2 may be rotated to different positions relative to the second part 4. For example, FIG. 1 shows the blow molded part 2 having a generally vertical surface 9, but the blow molded part 2 in this case may be rotated around so that the surface 9 is at approximately a 45 degree angle. Other positions and relative angles are possible, depending on the orientation of the surface 9 relative to the axis of the sealing region 5 and/or the angle of the spout 7 or pipe (not shown). Although FIG. 1 shows a watering can, it is understood that the features described herein could be applied to other water holding or dispensing devices such as showerheads or end caps for pipes.

Figure 4:
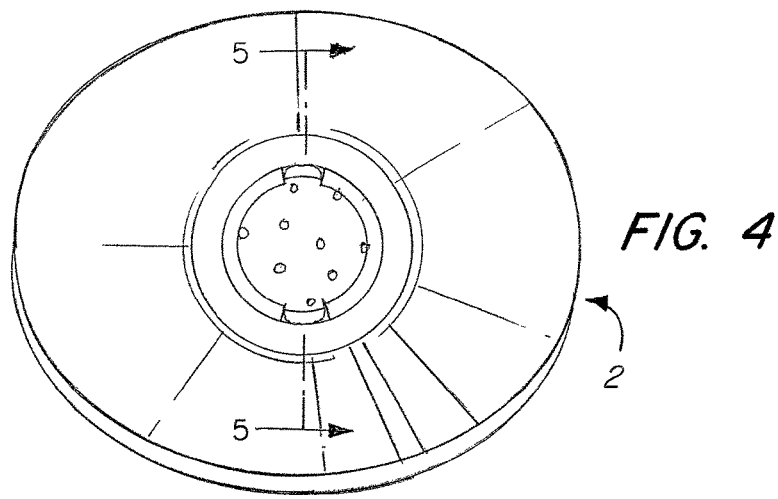
FIG. 4 is a side view of the blow molded part shown in FIG. 1.
Figure 5:
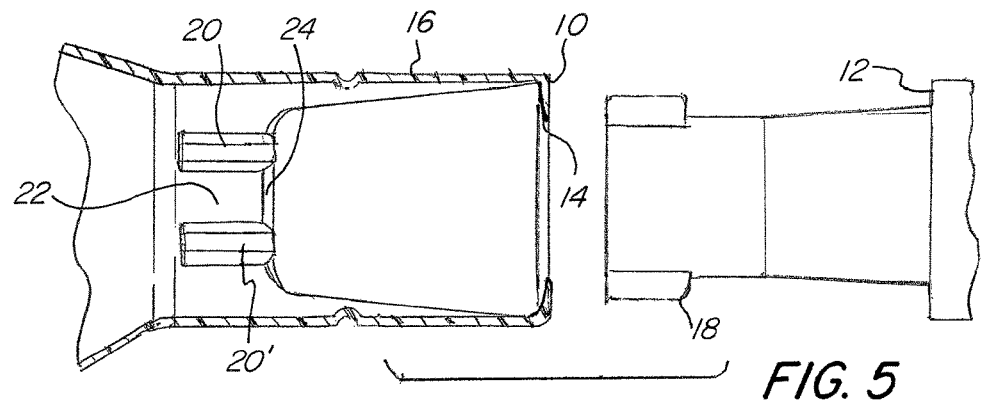
FIGS. 5 and 6 are exploded and assembled cutaway views of the blow molded part shown in FIG. 1.
Figure 6:
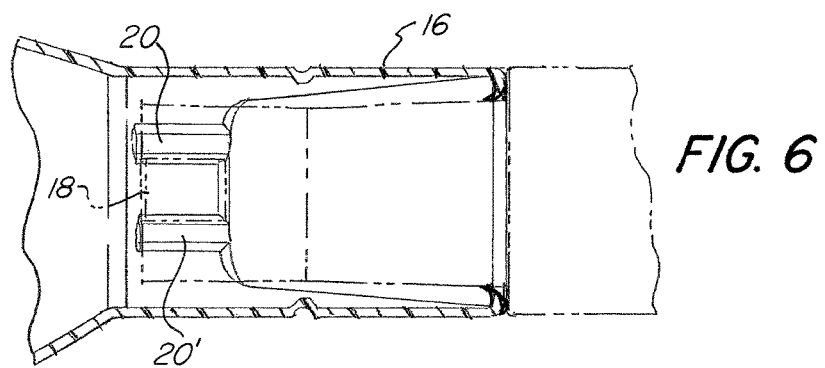
Figure 7:
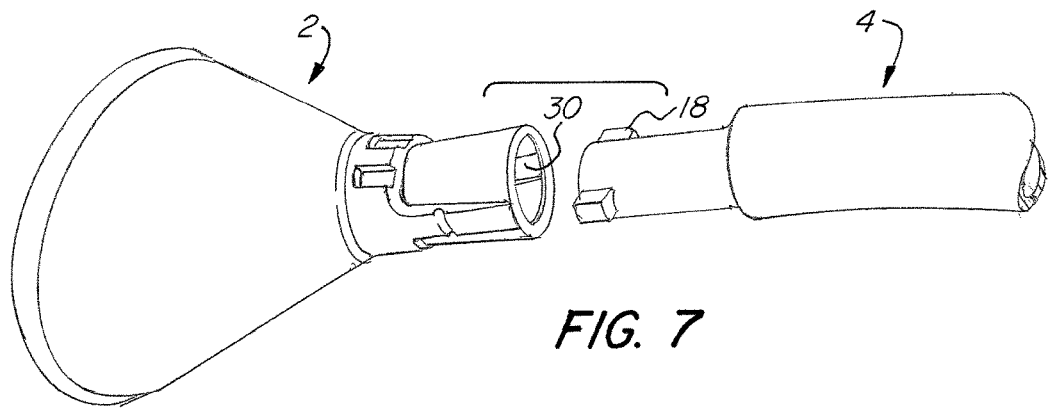
FIGS. 7-9 show how assembly is performed for the exemplary assembly of FIG. 1.
Figure 8:
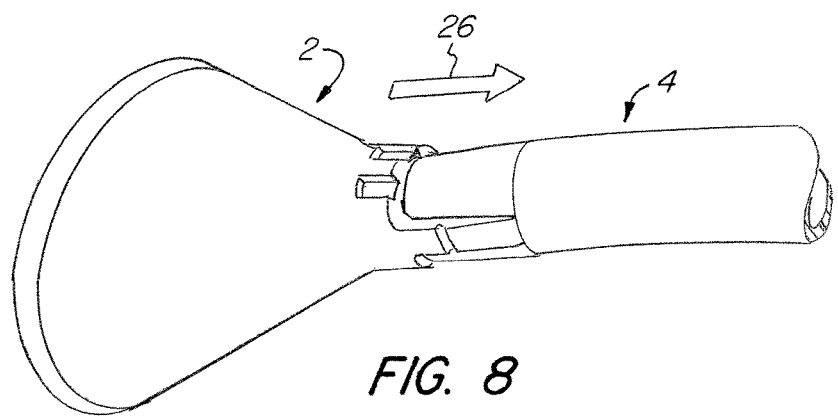
Figure 9:
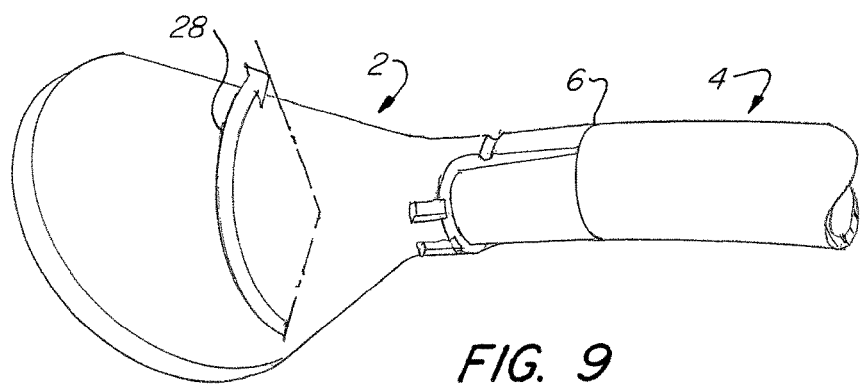

FIG. 4 shows a side view of the blow molded part 2 and section line 5-5. FIG. 5 shows an exploded sectional view along section line 5-5 of the assembly shown in FIG. 1. The blow molded part 2 includes peak 20 on either side of the notch 22. The protrusion 18 on the second part 4 locks within the notch 22 once inserted into the channel and then rotated as shown in FIGS. 7-9. Catch 24 retains protrusion 18 within the notch to prevent axial movement of the blow molded part 2 relative to the second part 4. FIG. 6 shows an assembled view of FIG. 5 and the protrusion 18 is retained in the notch 22 between peaks 20/20' and further retained by catch 24.

The process of locking the blow molded part 2 to the second part 4 is shown by FIGS. 7-9, where the parts are inserted together such that the protrusions 18 align with the channels 30 and the blow molded part 2 is inserted 26 over the second part 4. The parts 2,4 are rotated relative to each other 28 such that the protrusion travels over the peak 20/20' and is retained in the notch 22 and further retained by the catch 24. Connection 6 is created to seal the parts 2/4.

Figure 10:
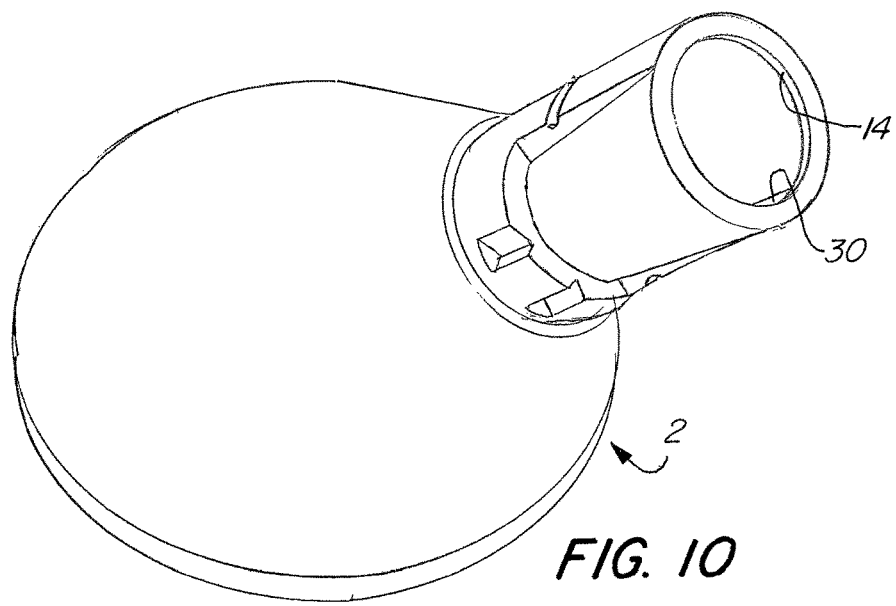
FIG. 10 is a perspective view of the blow molded part shown in FIG. 1.
Figure 11:
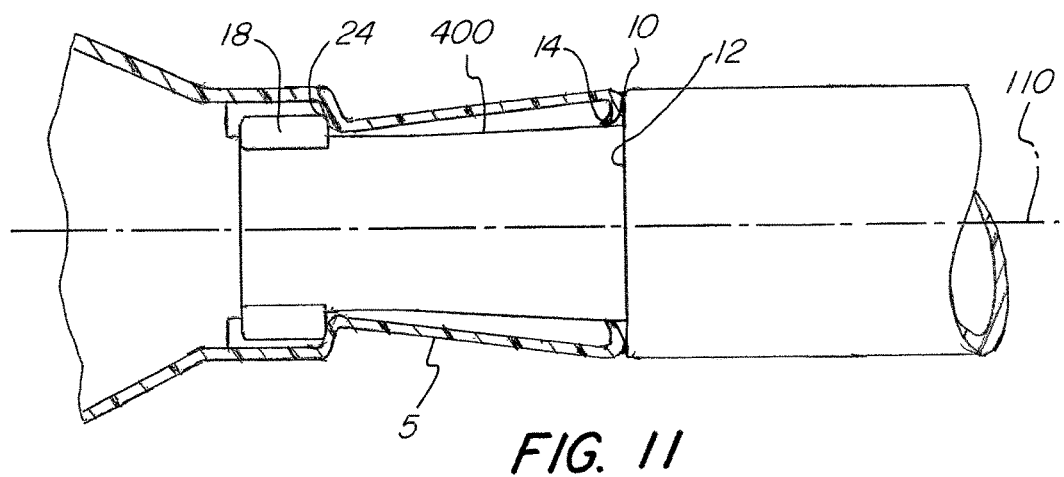
FIG. 11 is a partial cutaway view of the assembly of FIG. 1.

As shown in FIGS. 10, 11 and 14, in order to provide improved sealing, a sealing flange 14 extends towards a center of the sealing portion 5 towards central axis 110. This creates end surface 10, which is wider than the wall thickness at the sealing portion 5. Upon insertion 26, the sealing flange 14 may bend from position 140 to 142 as the outer surface of the second part 4 progressively is inserted into the sealing portion 5. Since the outer surface 400 may be tapered, the progressive insertion likewise progressively bends the sealing flange 14 and provides pressure between the sealing flange 14 and the outer surface 400 which thereby improves the seal of the connection 6. Further, when water pressure is introduced through the parts 2/4, the water pressure although relieved by the holes 8 may also provide pressure against the inner surface 146 of the sealing flange. This pressure would tend to press the sealing flange harder against the outer surface and thus provide a more leak resistant seal.

Figure 12:
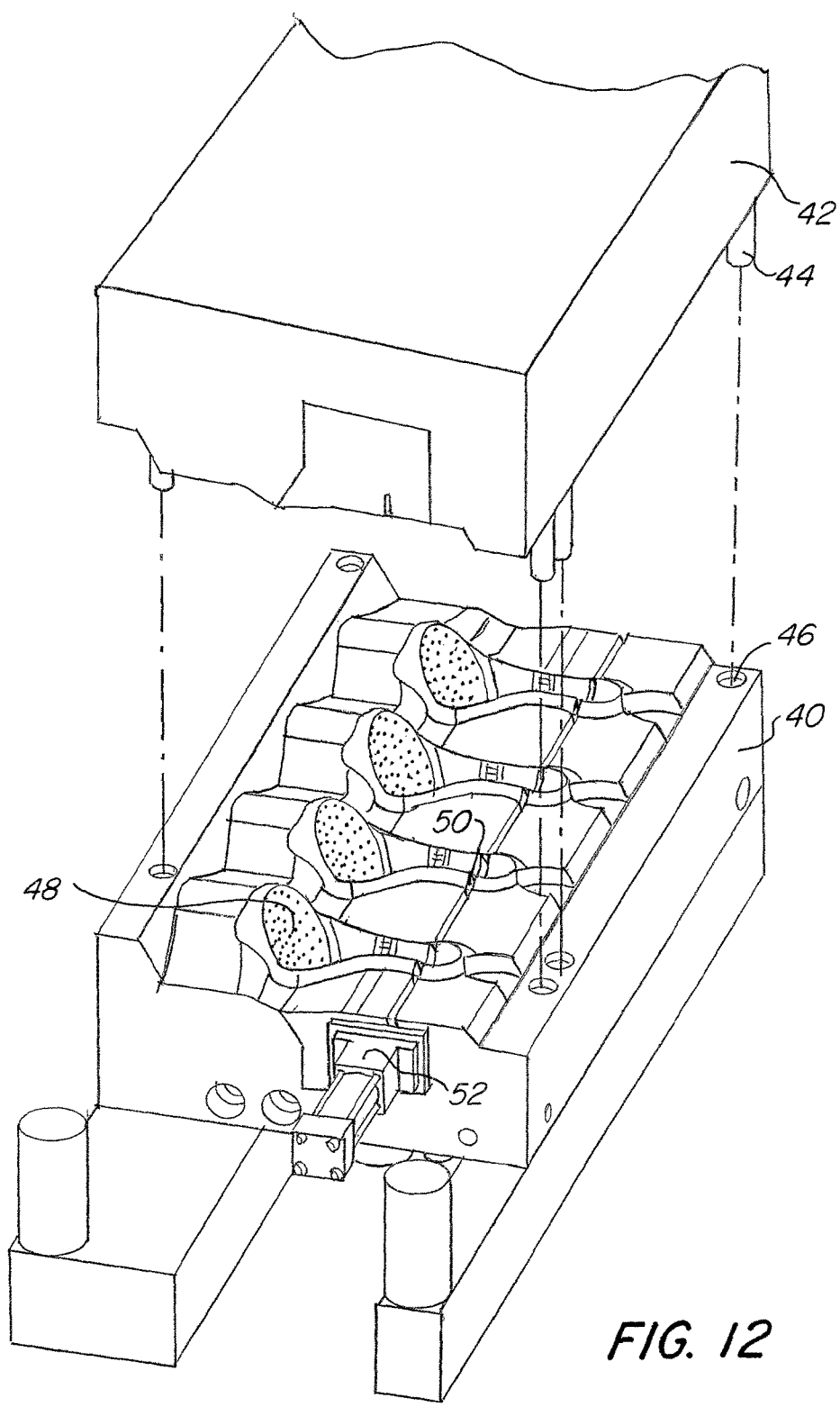
FIG. 12 is an exploded view of a mold for manufacturing the blow molded part of FIG. 1.
Figure 13A:
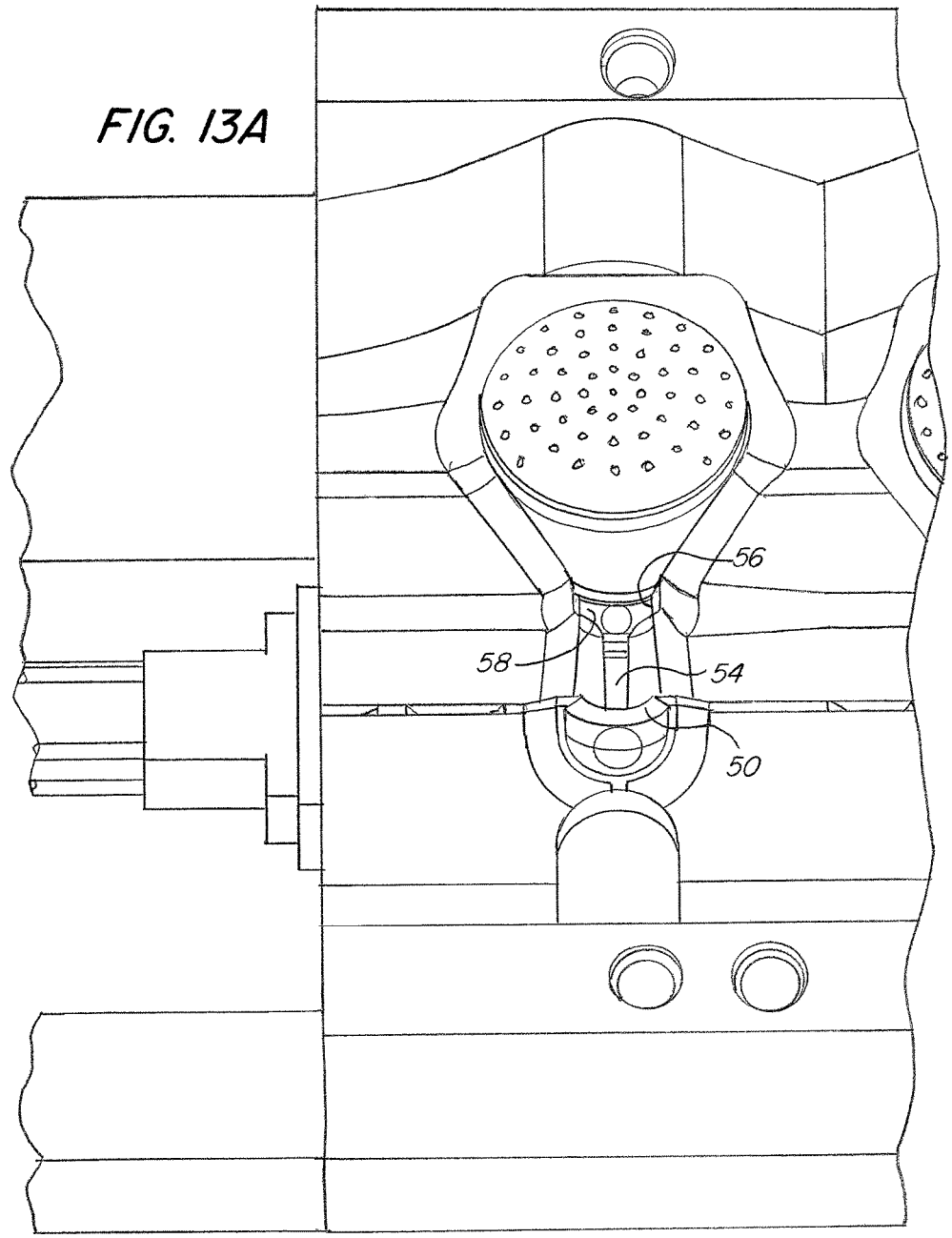
FIG. 13A is a detail view of the mold of FIG. 12 which is used to manufacture the blow molded part shown in FIG. 1.

In FIGS. 12, 13A/B and 15, aspects of the mold used in making the blow molded part are shown. Mold cavity 48 is formed upon joining mold sections 40 and 42. Reference protrusions/recesses 44/46 provide for proper alignment of the mold sections. Knives 50 are activated/moved within the mold by ram 52. As seen in FIG. 13A, the channel 54 and a recess 58 are defined within the mold cavity and the notch and peak structures of the blow molded part are also provided by the corresponding peak 56 and notch that are shown in the mold. Note that the notch is adjacent to the peak and the second mold half 42 includes the opposite side of the notch/peak combination which thereby creates the notch/peak 22/20 of the blow molded part 2.

Figure 13B:
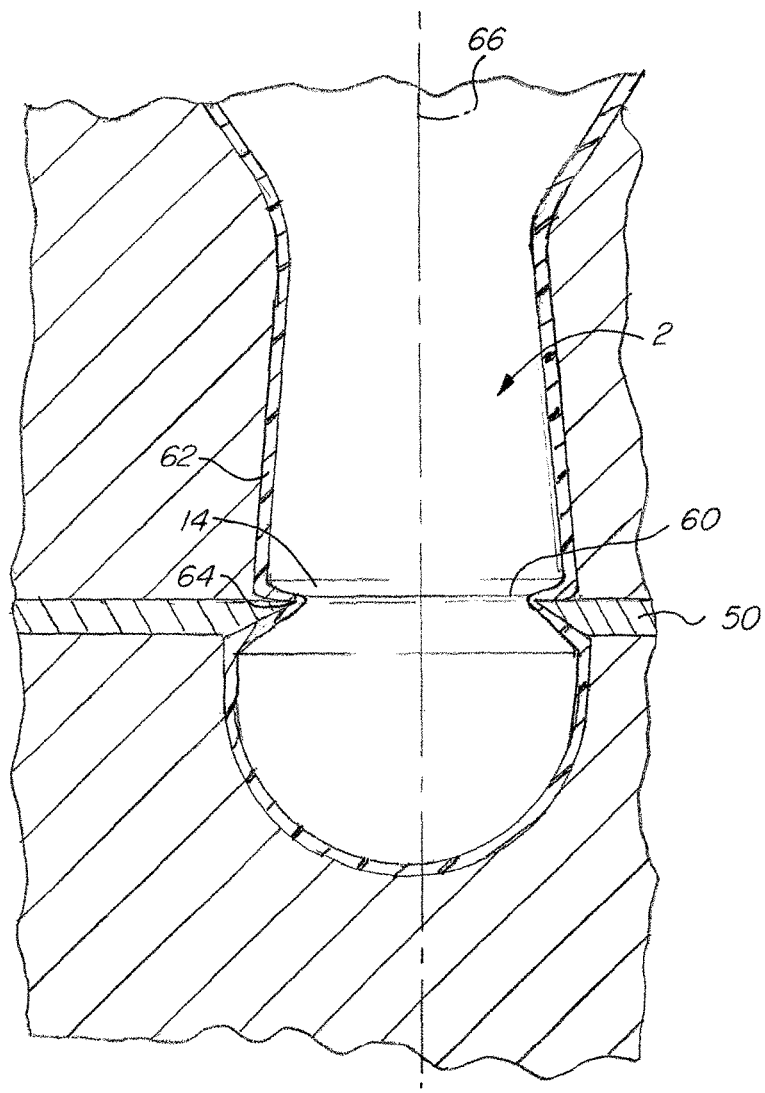
FIG. 13B is a detail partial cutaway view of the blow molded part of FIG. 1 shown during the molding process prior to movement of the blades.

In FIG. 13B, the blow molded part 2 is shown in the mold prior to cutting. The blade 50 and the corresponding blade on the other side of the mold are aligned such that the center of the blade aperture aligns with center 66. At the blade tip, the wall thickness 64 is less than the wall thickness 62. In some cases thickness 64 is 50% of thickness 62. In other cases, 75%. It is understood that the thickness may range anywhere from 90%-5%. This reduction in thickness creates the sealing flange 14 and the movement of the blades severs the parison along a line 60 that aligns with the blade edge. Although in some figures, the sealing flange 14 may have a constant thickness or a gradually reducing thickness.

Figure 14A:
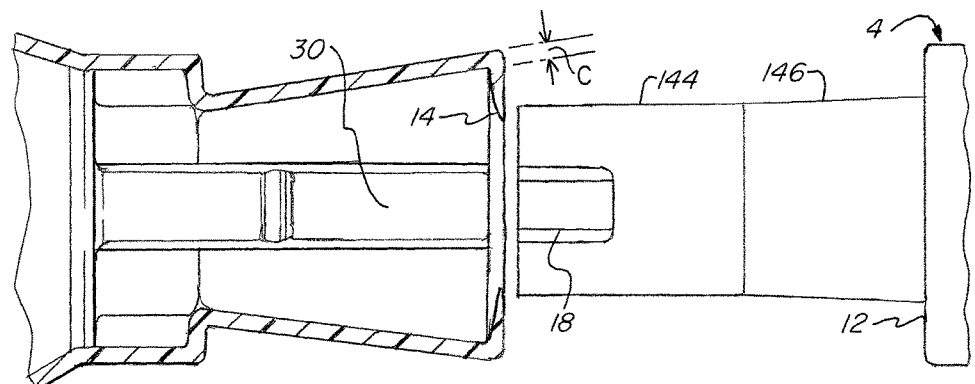
FIGS. 14A-C are detail cutaway views of the sealed connection of FIG. 1.
Figure 14B:
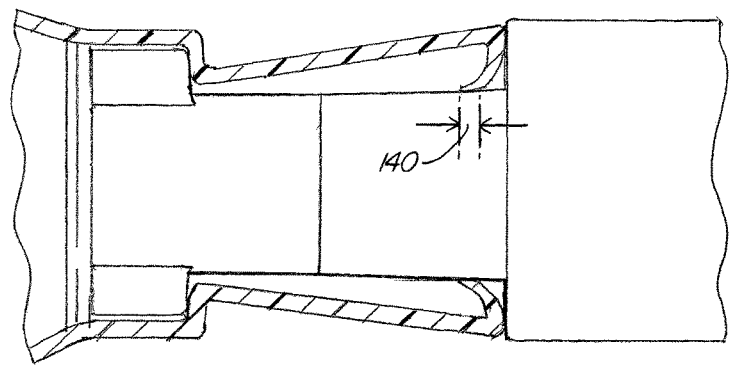
Figure 14C:
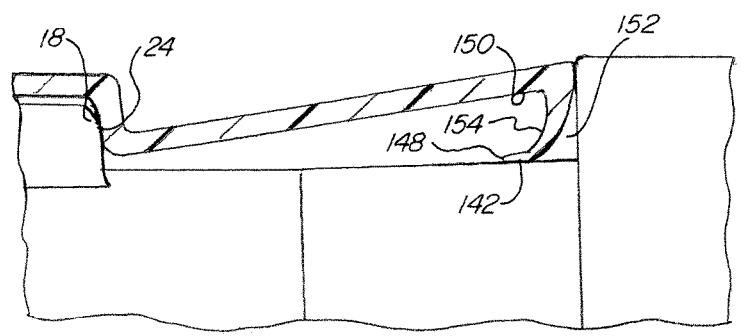

In FIG. 14A the assembly is shown before part 4 is inserted into the blow molded part 2. FIG. 14B shows the assembly and FIG. 14C shows a detail view of FIG. 14B. As can be seen, sealing flange 14 is generally pointed downward in FIG. 14A (in this view) towards the central axis of the assembly. Protrusion 18 inserts along channel 30 in the blow molded part 2 and rotated 28 (as shown in FIG. 9) to engage the protrusion 18 with catch 24. Upon insertion of the tapered section 146 causes the sealing flange 14 to bend and in some cases stretch inwards to create contact surface 142 which has a width 140. This contact surface is cylindrical in that the sealing flange defines a round hole. It is understood that the contact surface could be annular in the sense that the tapered 146 and straight 144 sections may have other cross sectional profiles such as square, elliptical and others. In each case, regardless of cross section, the sealing flange would extend into the opening beyond the thickness of the wall (C). Due to the molding process shown, the sealing flange is created both by stretching over the blade and cutting of the blade. The blade initially thins the sealing flange most of the way before cutting, and then upon cutting, there may be a pointed tip 148 or optionally a narrow flat surface at the tip 148 of the sealing flange. As can also be seen, the sealing flange rapidly increases in thickness when moving from the tip 148 towards inner corner 150 of the blow molded part 2. This provides sufficient flexing such that the sealing flange bends easily while reducing the possibility of plastic deformation of the sealing flange which would decrease the sealing pressure. Pressure such as water pressure is forced against surface 154 which increases sealing pressure at the sealing surface 142, which may in turn reduce gap 152 and increase the width 140 of contact surface 142. When the blow molded part 2 is installed over part 4, the blow molded part is moved in a installation direction and the tip 148 bends opposite the installation direction (or away from part 4) while the base of the sealing flange moves in the installation direction (or with the blow molded part 2) thus causing the sealing flange to flex in a curved shape to form the gap 152 between stop 12 and the outer surface of the sealing flange. As shown, the sharpness of the curve in the sealing flange when installed progressively increases from the base 150 towards the tip 148 due to the narrowing of the sealing flange from base towards tip 148.

Figure 15:
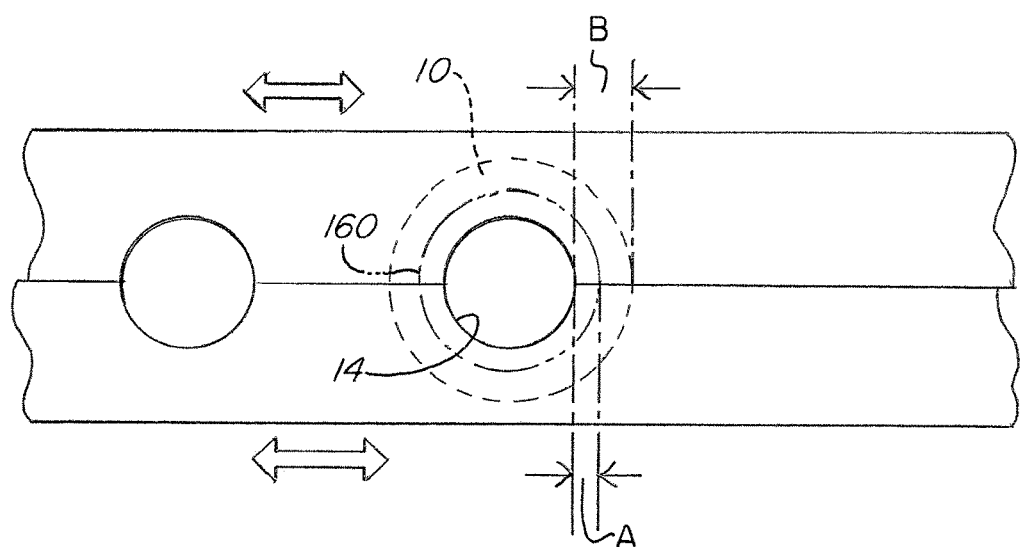
FIG. 15 is a side view of the cutting blades of the mold shown in FIGS. 12 and 13A and 13B which is used to manufacture the blow molded part shown in FIG. 1.
Figure 16:
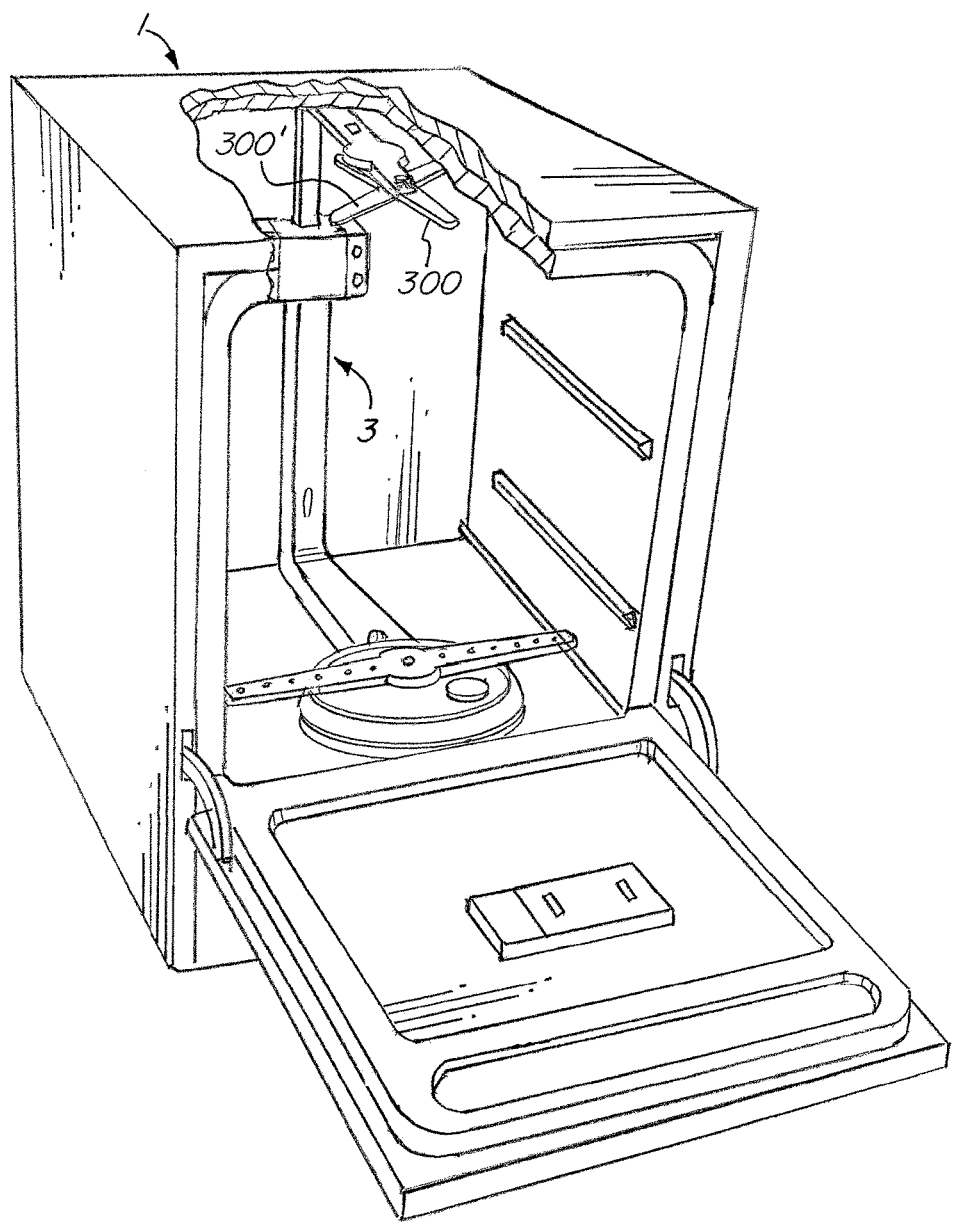
FIG. 16 is a partial cutaway perspective view of a second exemplary assembly including a blow molded part according to the present disclosure.
Figure 17:
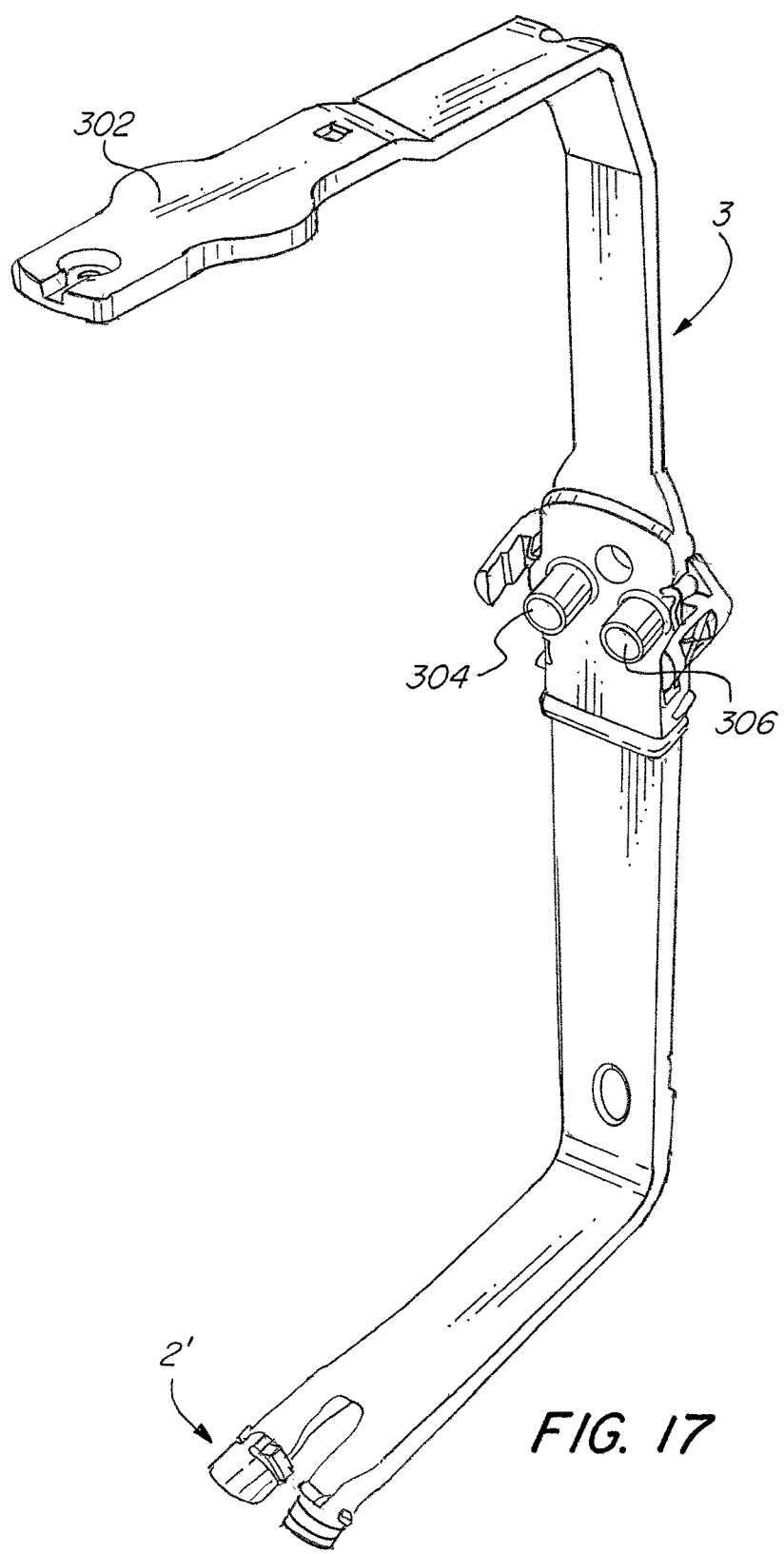
FIG. 17 is a perspective of the blow molded part assembly of FIG. 16.
Figure 18:
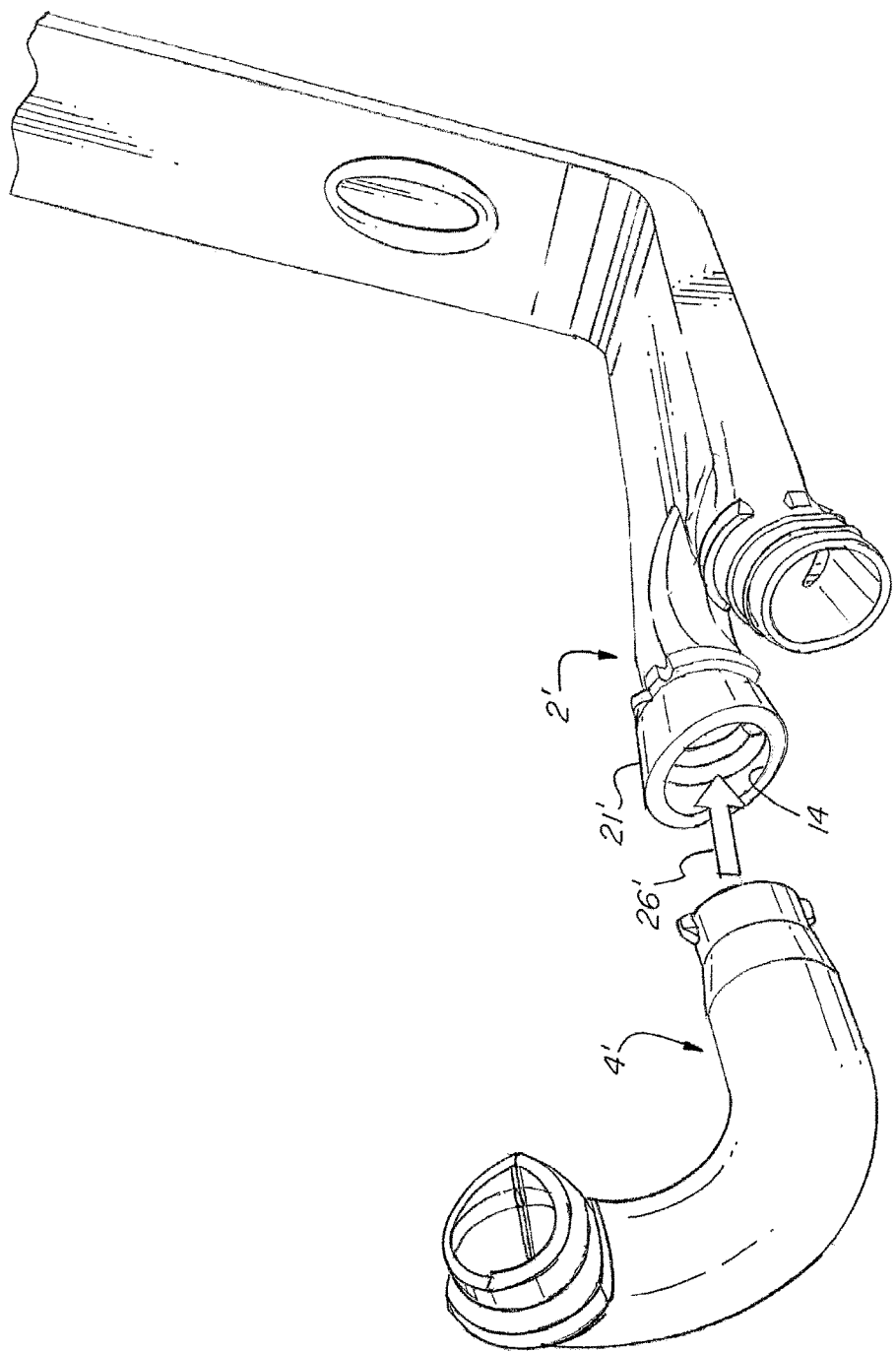
FIGS. 18 and 19 show how the blow molded part assembly of FIG. 16 is assembled.
Figure 19:
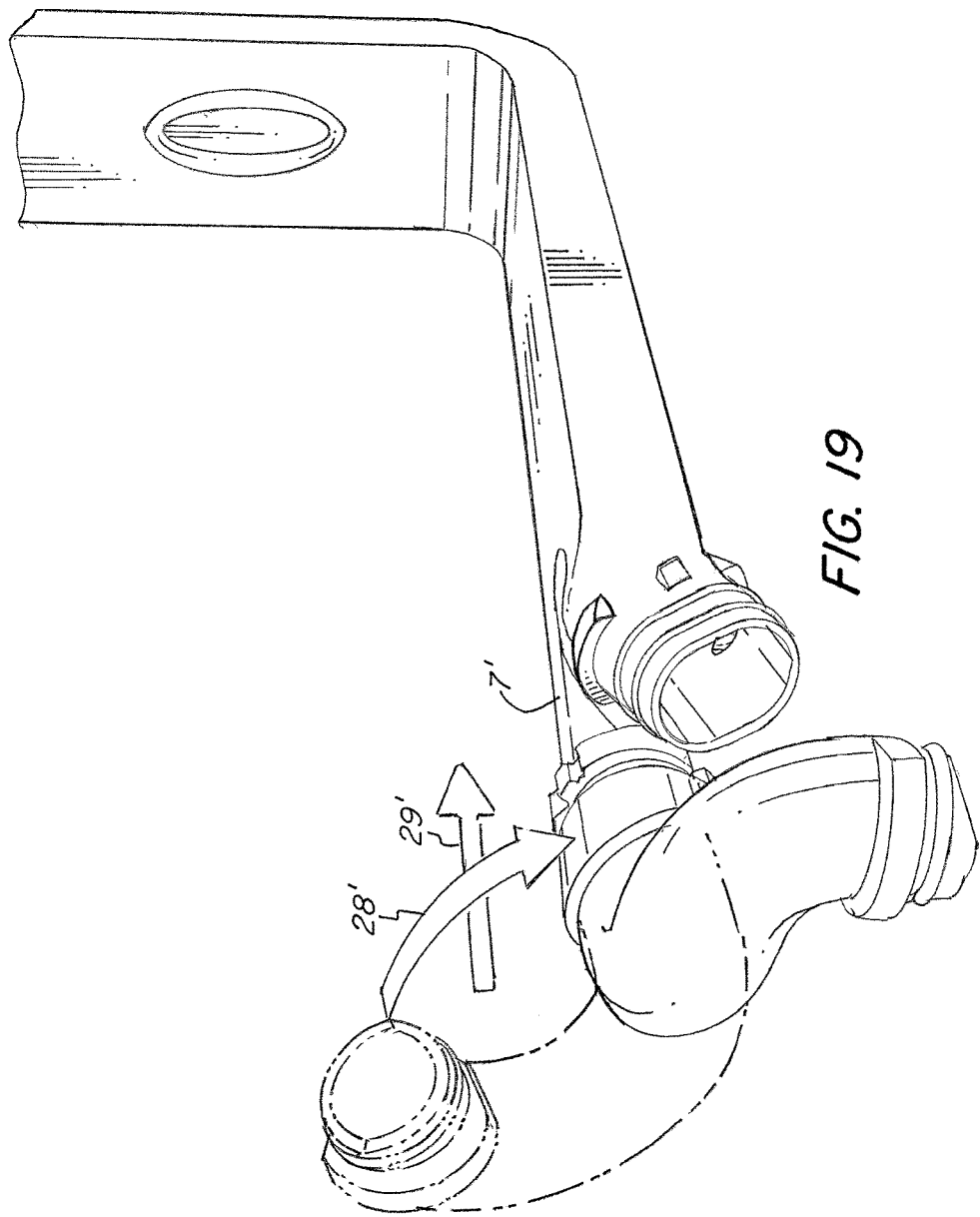
Figure 20:
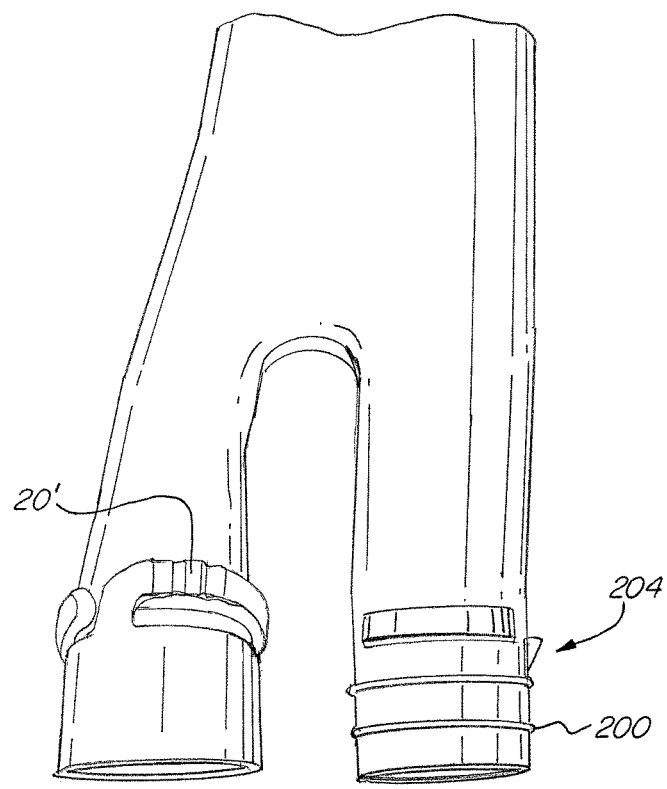
FIG. 20 is a top detail view of the blow molded part assembly of FIG. 16.

In FIG. 15, the end surface 10 and the sealing flange 14 of the blow molded part 2 is shown. The distance (A) that the sealing flange 14 extends from the inner wall of the blow molded part 2 is approximately equal to the wall thickness, for example, distance (B) is approximately twice or more distance (A). It is understood that depending on the taper of the outer surface 400 of the second part, the wall thickness of the blow molded part 2, the distance (A) may vary. For example, a steeper taper of outer surface 400 would result in less extension (A) of the sealing flange being necessary. A shallower taper would likewise require longer extension of the sealing flange.

Referring to FIGS. 16-23 a dishwasher 1 includes a feed tube 3 assembly installed therein. The feed tube moves water to different locations within the dishwasher, for example to clean both the bottom and top trays. For example, water spray bars 300, 300' may rotate to distribute water and cleaning solution to aid in cleaning. The feed tube assembly 3 may include a number of parts, including parts 2' and 4'. One end 21' of part 2' may include the sealing flange 14' which extends and tapers beyond the inner wall at the end 21'. This sealing flange 14' is similar to sealing flange 14 shown in the watering can example depicted in FIG. 1.

Figure 21:
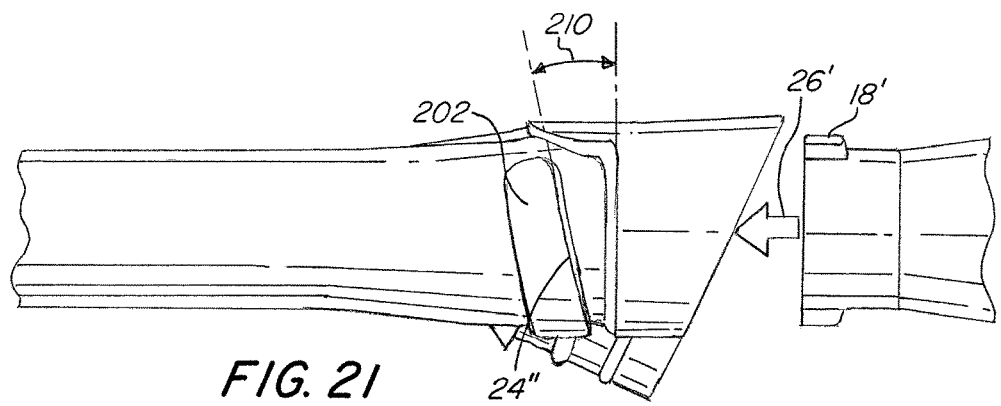
FIG. 21 is a side detail view FIG. 18.

Part 4' is inserted 26' into the opening of end 20' and rotated 28'. As shown in FIG. 21, part 2' includes a catch 24'. As shown on the outer side of the part 2' edge 24" corresponds to catch 24' and is located at an angle 210 with respect to perpendicular. This angle 210 of the catch 24' acts like a screw thread to cause a slight axial movement 29' of part 4' during rotation 28' because protrusion 18' is retained by the catch 24'. This angle 210 and the axial movement 29' may progressively compress or deform the sealing flange 14' during coupling of the parts 2'/4'.

A hose (not shown) may insert over end 204 and rings 200 may provide additional sealing against the hose.

Figure 22:
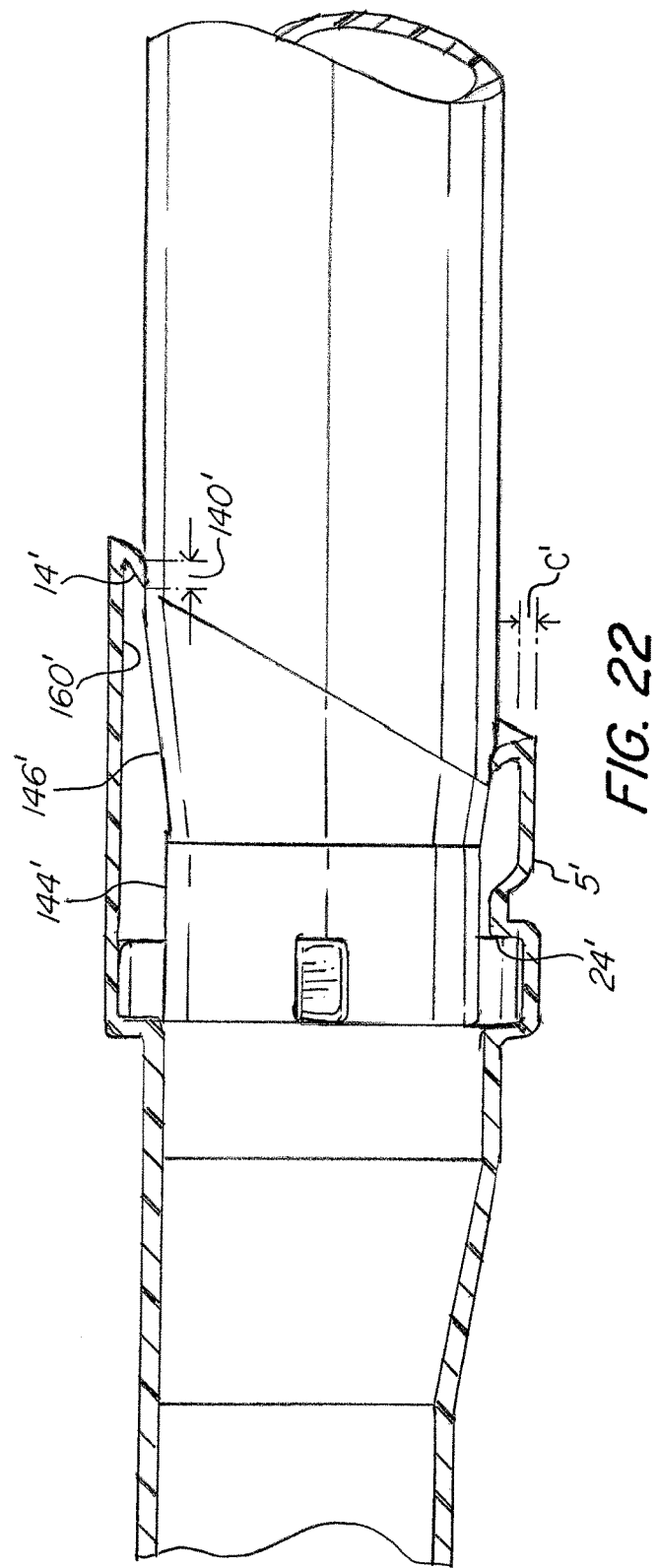
FIG. 22 is a partial cross section view of the blow molded part of FIG. 16.

As shown in FIG. 22, a contact area 140' is created between part 4' and part 2' when assembled, which causes the sealing flange 14' to deform slightly. The sealing flange 14' may have a length equal to wall thickness C' or greater than wall thickness C' when measured from inner surface 160'.

Figure 23:
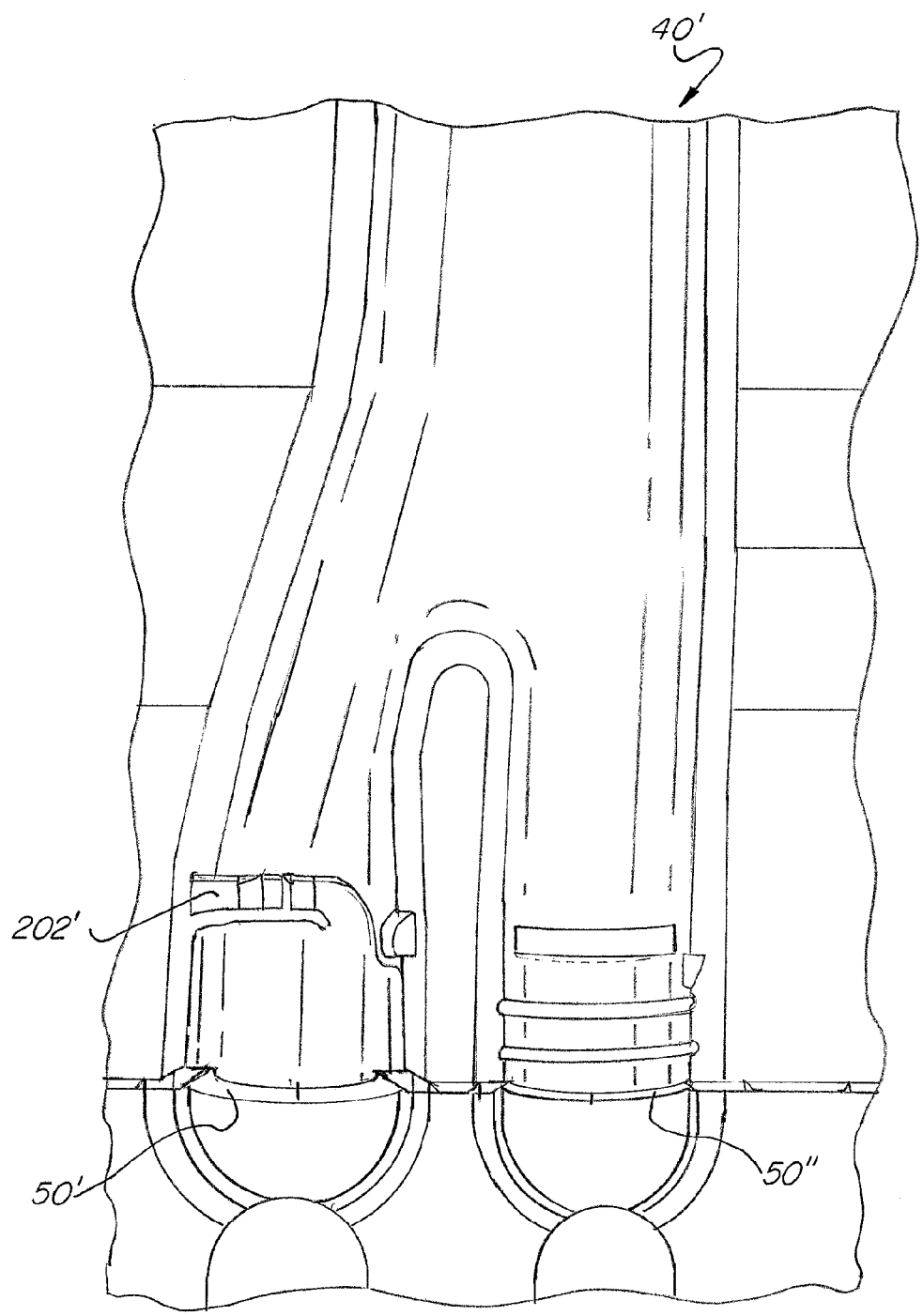
FIG. 23 is a top view of part of a mold for making the blow molded part of FIG. 16.

Referring to FIG. 23, a detail of mold section 40' is shown. This mold section includes a moveable blade with two blade sections 50' and 50". Blade section 50' extends into the mold cavity and operates in a similar manner to blade 50 shown for example in FIG. 13A. Blade 50" does not extend as far into the mold cavity as blade 50' so that end 204 does not include sealing flanges and end 21' does include sealing flanges. Depending on the desired configuration, it is also contemplated that a blade extending into the cavity as blade 50' does could be substituted for 50" to thereby create a blow molded part that would have two end sections 204/21' having the sealing flanges. As shown in FIG. 23, the recess 202' that creates the edge 24' and catch 24" is approximately perpendicular to the axis of end 21'. Depending on the desired configuration, the assembly, recess 202' could be angled to cause the axial movement 29' described herein.

It is contemplated that the location of the sealing flange could be reversed with respect to the two parts 2/4 such that the sealing flange would extend outwardly from the part 4 and that tapering could be used on the outer part. The protrusions, notches and channels described herein may also be reversed with respect to parts 2/4 to create the locking features described herein. It is also contemplated that the protrusion and the sealing flange could extend from the same part, depending on the desired configuration.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An assembly of fluid conduit parts having a sealed connection between the fluid conduit parts comprising:
   a blow molded part having a first portion;
   a second part including an outer section;
   a sealing flange extending from a first end of the first portion towards a central axis of the first portion at a distance, an end of said sealing flange defining an opening;
   said second part adapted to insert into the opening in an insertion direction and at least part of the tapered section of the second part has a size larger than the opening;
   said sealing flange flexing in the insertion direction upon insertion of said second part into said opening such that the end of said sealing flange moves inwardly in the insertion direction and a contact surface is defined between the outer section and the sealing flange such that the contact surface extends around a perimeter of the outer section where the sealing flange contacts the outer section; and
   the flexing of the sealing flange caused by contact between the contact surface and the tapered section;
   a channel located between the first end of said first portion and another end of the blow molded part;
   a protrusion located on the second part and sized to fir in said channel such that the protrusion can move from a first position towards a second position, where the first position is closer to the end than the second position.

2. The assembly of claim 1 wherein the distance is measured from an inner surface of the blow molded part and is at least as large as a wall thickness of the blow molded part.

3. The assembly of claim 2 wherein the second part is a pipe.

4. The assembly of claim 1 further comprising:
   a fluid dispensing portion connected to said first portion, said fluid dispensing portion including at least one hole such that the fluid can escape the blow molded part through the hole.

5. The assembly of claim 4 further comprising:
   a maximum pressure defined as a maximum fluid pressure against the sealing flange that can be sustained by the sealing flange to prevent fluid from exiting the blow molded part at the end;
   said fluid generating a first pressure against the sealing flange on an inner surface of the sealing flange, the first pressure having a first value;
   said at least one hole defining an escape area, the escape area sized such that the maximum pressure is greater than the first pressure.

6. The assembly of claim 1 further comprising:
   a catch located at an end of said channel such that when said protrusion is located at the second position, the blow molded part can be rotated relative to the second part to engage the protrusion against said catch.

7. The assembly of claim 1 further comprising:
   a lock holding the blow molded part in place when a fluid is introduced into the blow molded part such that a pressure of the fluid presses against an inner surface of said sealing flange to thereby increase a sealing pressure between the contact surface and the outer section.

8. The assembly of claim 1 further comprising an inner surface of the sealing flange being opposite the contact surface wherein upon pressurization of the assembly of fluid conduit parts with fluid, the fluid contacts the inner surface to increase a pressure between the contact surface and the second part.

9. The assembly of claim 1 wherein the sealing flange narrows in thickness from a base to a tip thereof.

10. An assembly of fluid conduit parts having a sealed connection between the fluid conduit parts comprising:
a blow molded part having a first portion;
a second part including an outer section;
a sealing flange extending from a first end of the first portion towards a central axis of the first portion at a distance, an end of said sealing flange defining an opening;
said second part adapted to insert into the opening and at least part of a tapered section of the second part has a size larger than the opening;
said sealing flange flexing upon insertion of said second part into said opening to define a contact surface between the outer section and the sealing flange such that the contact surface extends around a perimeter of the outer section where the sealing flange contacts the outer section; and
a lock holding the blow molded part in place when a fluid is introduced into the blow molded part such that a pressure of the fluid presses against and the fluid directly contacts an inner surface of said sealing flange to thereby increase a sealing pressure between the contact surface and the outer section;
a channel located between the first end of said first portion and another end of the blow molded part;
a protrusion located on the second part and sized to fit in said channel such that the protrusion can move from a first position towards a second position, where the first position is closer to the end than the second position.

11. The assembly of claim 10 wherein the distance is measured from an inner surface of the blow molded part and is at least as large as a wall thickness of the blow molded part.

12. The assembly of claim 10 further comprising:
a fluid dispensing portion connected to said first portion, said fluid dispensing portion including at least one hole such that the fluid can escape the blow molded part through the hole.

13. The assembly of claim 12 further comprising:
a maximum pressure defined as a maximum fluid pressure against the sealing flange that can be sustained by the sealing flange to prevent fluid from exiting the blow molded part at the end;
said fluid generating a first pressure against the sealing flange, the first pressure having a first value;
said at least one hole defining an escape area, the escape area sized such that the maximum pressure is greater than the first pressure.

14. The assembly of claim 10 wherein the second part is a pipe.

15. The assembly of claim 10 wherein the sealing flange narrows in thickness from a base to a tip thereof.

16. An assembly of fluid conduit parts having a sealed connection between the fluid conduit parts comprising:
a blow molded part having a first portion;
a second part including an outer section;
a sealing flange extending from the first portion towards a central axis of the first portion at a distance, an end of said sealing flange defining an opening;
said second part adapted to insert into the opening and at least part of a tapered section of the second part has a size larger than the opening;
said sealing flange flexing upon insertion of said second part into said opening to define a contact surface between the outer section and the sealing flange such that the contact surface extends around a perimeter of the outer section where the sealing flange contacts the outer section;
a channel located between a first end of said first portion and another end of the blow molded part;
a protrusion located on the second part and sized to fit in said channel such that the protrusion can move from a first position towards a second position, where the first position is closer to the end than the second position;
a catch located at an end of said channel such that when said protrusion is located at the second position, the blow molded part can be rotated relative to the second part to engage the protrusion against said catch; and
a notch defined by said catch, said notch located between two peaks formed in the blow molded part such that upon rotation of blow molded part said protrusion presses against one of said two peaks to thereby allow the protrusion to advance past the one of said two peaks such that the protrusion is located within said notch.

17. The assembly of claim 16 wherein the distance is measured from an inner surface of the blow molded part and is at least as large as a wall thickness of the blow molded part.

18. The assembly of claim 16 further comprising:
a fluid dispensing portion connected to said first portion, said fluid dispensing portion including at least one hole such that the fluid can escape the blow molded part through the hole.

19. The assembly of claim 18 further comprising:
a maximum pressure defined as a maximum fluid pressure against the sealing flange that can be sustained by the sealing flange to prevent fluid from exiting the blow molded part at the end;
said fluid generating a first pressure against the sealing flange, the first pressure having a first value;
said at least one hole defining an escape area, the escape area sized such that the maximum pressure is greater than the first pressure.

20. The assembly of claim 16 further comprising:
a lock holding the blow molded part in place when a fluid is introduced into the blow molded part such that a pressure of the fluid presses against an inner surface of said sealing flange to thereby increase a sealing pressure between the contact surface and the outer section.

21. The assembly of claim 16 wherein the second part is a pipe.

22. The assembly of claim 16 wherein the sealing flange narrows in thickness from a base to a tip thereof.

* * * * *